United States Patent
Staley et al.

(10) Patent No.: US 6,189,480 B1
(45) Date of Patent: *Feb. 20, 2001

(54) ANALOG GAUGE POINTER

(75) Inventors: Michael J. Staley, Rockford; J. Peter Meyer, Belmont, both of MI (US)

(73) Assignee: Monroe, Inc., Grand Rapids, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/888,484

(22) Filed: Jul. 7, 1997

Related U.S. Application Data

(60) Provisional application No. 60/021,582, filed on Jul. 8, 1996.

(51) Int. Cl.$^7$ .................................................. G01D 13/22
(52) U.S. Cl. .............................................. 116/288; 362/26
(58) Field of Search ................................. 116/286, 287, 116/288; 362/26, 28–30

(56) References Cited

U.S. PATENT DOCUMENTS

| | | | |
|---|---|---|---|
| 5,142,456 | * | 8/1992 | Murphy ................................ 116/288 |
| 5,703,612 | * | 12/1997 | Salmon et al. ....................... 116/288 |

FOREIGN PATENT DOCUMENTS

| | | | |
|---|---|---|---|
| 3824391 | * | 1/1990 | (DE) .................................... 116/288 |
| 2185576 | * | 7/1987 | (GB) .................................... 116/288 |
| 48726 | * | 3/1991 | (JP) ..................................... 116/286 |

* cited by examiner

Primary Examiner—Andrew H. Hirshfeld
(74) Attorney, Agent, or Firm—Varnum, Riddering, Schmidt & Howlett LLP

(57) ABSTRACT

A pointer assembly (12) is disclosed, which is mounted to a conventional gauge assembly (14). The assembly includes a pointer (20) having an elongated tapered body (70), with the body (70) having a proximal end (76) and a distal end (78). Illumination from a light source (36) is provided to a light pipe (34) which transmits the collected light from the source (36) upwardly toward a base (22) at a point forward of a gauge shaft (30). The transmitted light is redirected by a beveled surface (100) toward the rear where the light is once again redirected by a second beveled surface (104) thereof. The light then travels upwardly into the proximal end (76) of the pointer (20), where it is redirected toward the distal end (78) of the pointer (20) by a third beveled surface (90). A liner (96) is provided which is mounted to the underside of the pointer (20). Light rays encountering the liner are reflected upwardly through the top surface of the pointer body (70). The pointer is thereby provided with uniform illumination from its proximal end (76) to its distal end (78). In addition, a pair of triangular protrusions (530, 532) are also provided, so that collected light redirected by the protrusions will be directed along a centerline of a body of the pointer.

1 Claim, 6 Drawing Sheets

ANALOG GAUGE POINTER

This application claims the benefit of Provisional Application Ser. No. 60/021,582, filed Jul. 8, 1996.

BACKGROUND OF THE INVENTION

1. Field of the Invention

This invention relates to analog gauges and dials and, more specifically, to the construction and light characteristics of a tip-to-tail pointer for use with analog gauges and dials.

BRIEF DESCRIPTION OF THE DRAWINGS

The invention will now be described with reference to the drawings in which.

DETAILED DESCRIPTION OF THE PREFERRED EMBODIMENTS

Figure 1:
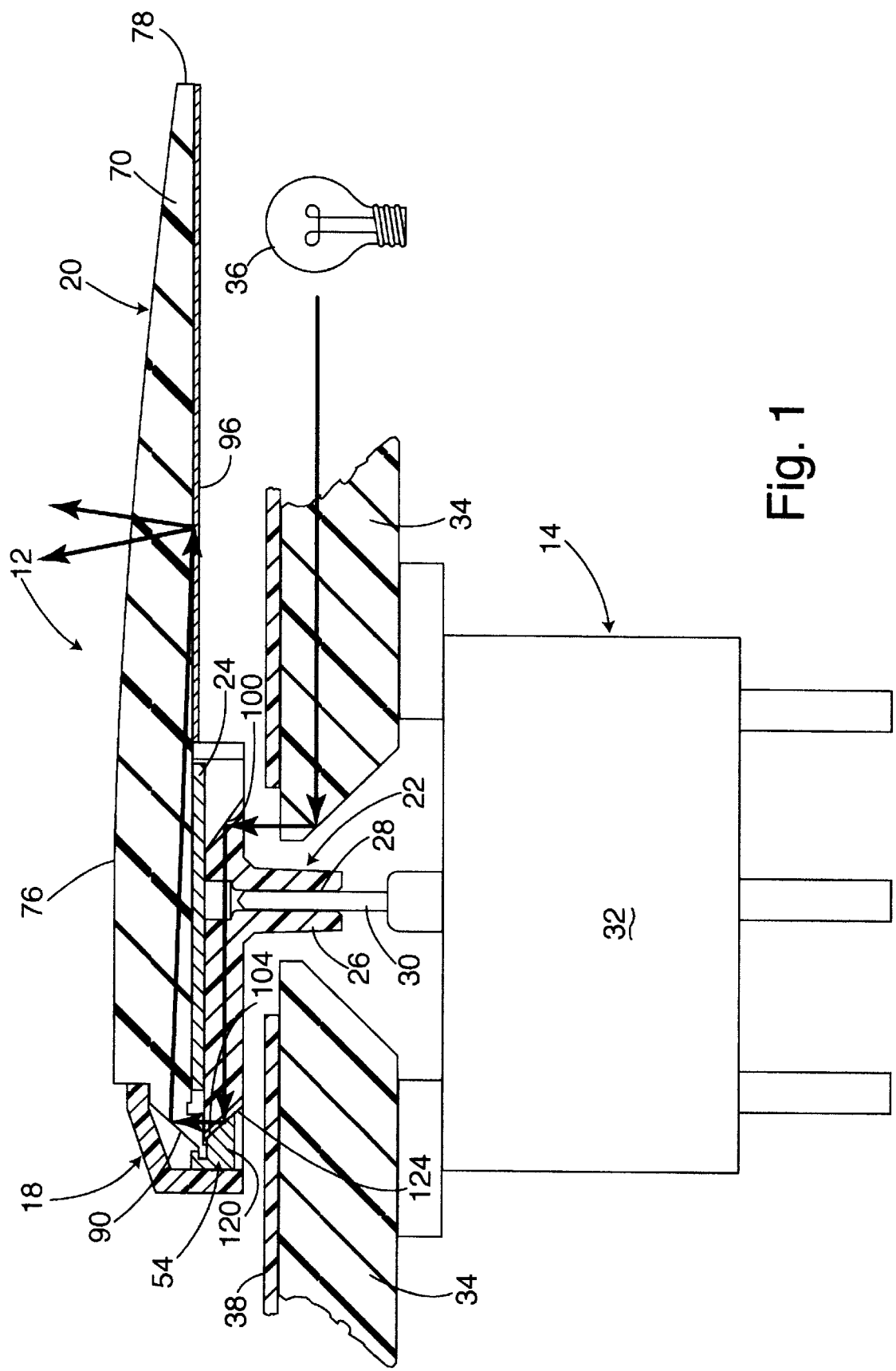
FIG. 1 is a partial, sectional view of a first embodiment of a pointer assembly according to the invention mounted to a conventional analog gauge and light source.

Turning now to the drawings, FIG. 1 shows a first embodiment of a pointer assembly 12 according to the invention mounted to a conventional gauge assembly 14. In this embodiment, the pointer assembly comprises a cap 18 which houses a pointer 20, a base 22, and a filter 24 positioned between the pointer 20 on the base 22. The base 22 has a mounting stem 26 extending downwardly therefrom with a shaft aperture 28 extending longitudinally therethrough. The shaft aperture 28 is adapted to telescopically receive at least a portion of a gauge shaft 30 which typically extends outwardly from a gauge 32 in the analog gauge assembly 14 mounted in a vehicle dashboard system (not shown). At least one conventional light pipe 34 is provided in the dashboard for conducting light from a conventional light source such as a bulb 36. The pointer assembly 12 is mounted to the gauge assembly 14 for the purpose of producing an analog display of the output of the gauge 32. For example, the pointer assembly 12 could, in conjunction with an applique 38 provided on the dashboard, display the speed of the vehicle. Alternatively, the pointer assembly 12 could be incorporated into a tachometer, a fuel gauge, a temperature gauge, an oil pressure gauge, or any other analog-type gauge which is illuminated with a conventional light source.

Figure 2:
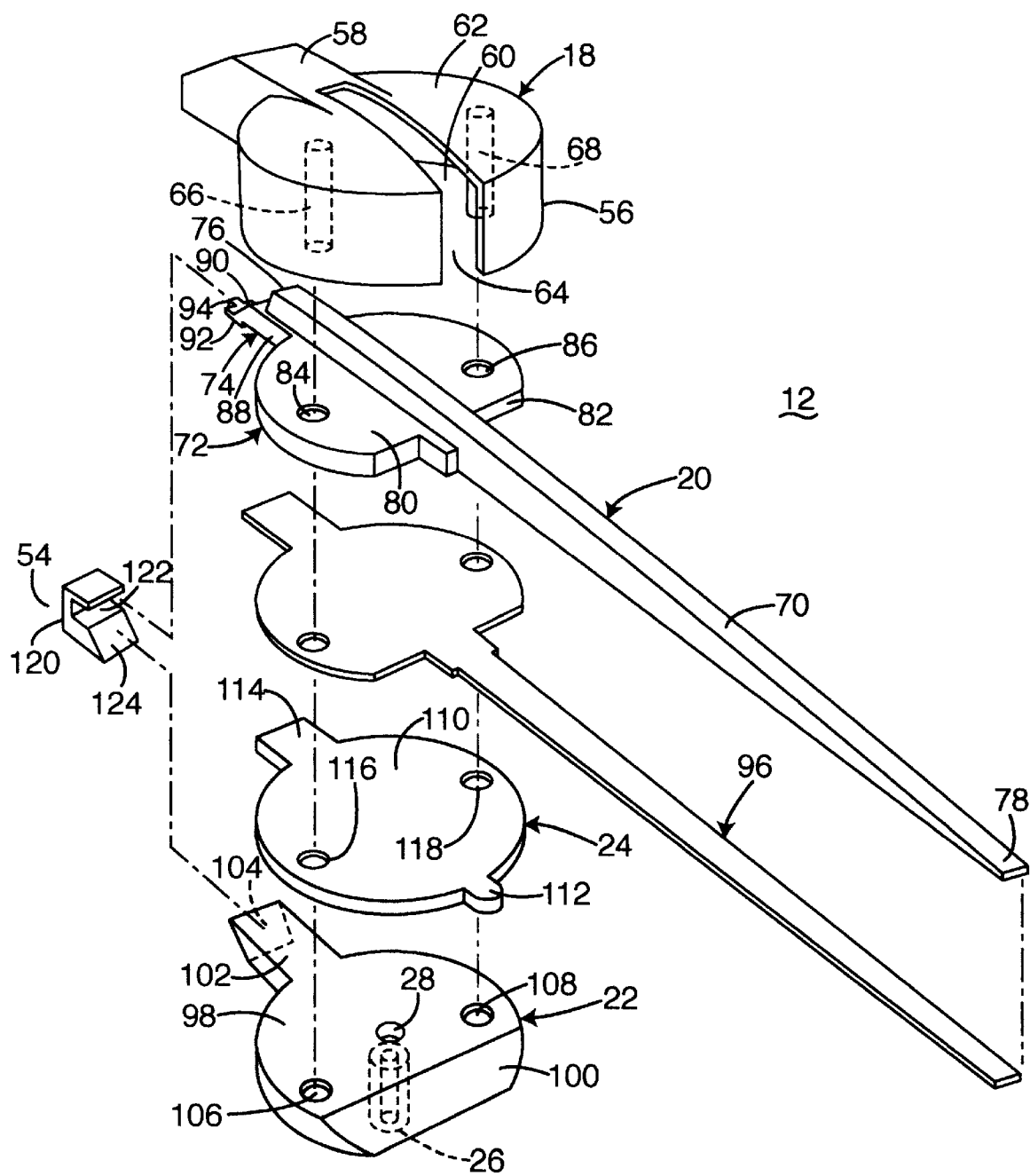
FIG. 2 is an exploded view of the pointer assembly of FIG. 1 with the remaining elements of the surroundings removed for clarity.

The pointer assembly 12 is shown in greater detail in FIG. 2. In this embodiment, the cap 18 in the pointer assembly 12 partially surrounds the pointer 20 and the base 22. In this embodiment, a counter-weight 54 is also provided at the tail of the pointer 20.

The cap 18 comprises a substantially cylindrical shell body 56 having a rounded top surface 62 and a tail projection 58 extending from one end thereof. A substantially horizontal channel 60 is formed in the top surface 62 of the cap and extends from the tail projection 58 across the entire top surface 62 and terminates in a substantially vertical channel 64 in the body 56. First and second vertical posts 66 and 68 extend downwardly from the interior surface of the top surface 62 and are spaced on either side of the horizontal channel 60.

The pointer 20 comprises an elongated tapered body 70, a circular pedestal 72, and a flange 74. The body 70 has a proximal end 76 and a distal end 78 tapered so that the greatest height of the body is at or near the proximal end 76 and the narrowest height of the body 70 is adjacent the distal end 78. The pedestal 72 extends laterally outwardly from the body 70 adjacent the proximal end 76 so that the tapered body 70 divides the pedestal 72 into two equal, substantially semi-circular portions 80 and 82. Each semicircular portion 80 and 82 is provided with an aperture 84 and 86 in a spaced alignment to correspond to the configuration of the spaced posts 66 and 68 on the cap 18. The flange 74 extends rearwardly from the pedestal 72 adjacent the proximal end 76 of the body 70 and comprises a trapezoidal body 88 having a beveled rear surface 90 and a horizontal plate 92 extending rearwardly adjacent the bottom edge of the rear surface 90 which terminates in a tab 94. The pointer 20 is further provided with a liner 96 mounted to the underside thereof which preferably comprises a polymeric film which is heat stamped to the pointer 20 and covers the entire underside of the pointer 20, except for the plate 92 and the apertures 84 and 86. The liner 96 is selected to be a highly reflective material, and experimentation has shown that a white-colored material is very effective.

The base 22 comprises the shaft 26 having aperture 28 extending from its underside and further comprises a substantially circular body 98 truncated at a forwardly extending beveled edge 100. A rectangular flange 102 extends from a rearward central portion of the body 98 and is provided with an inwardly-beveled rear surface 104. The body 98 is further provided with first and second apertures 106 and 108 in a spaced alignment to correspond to the configuration of the spaced posts 66 and 68 on the cap 18. The base 22 is preferably constructed from a similar material as the pointer body 70.

The filter 24 comprises a substantially circular body 110 having a rounded tab 112 at a forward portion and a rectangular flange 114 at a directly opposite rearward portion. The body 110 is further provided with first and second apertures 116 and 118 in a spaced alignment to correspond to the configuration of the spaced posts 66 and 68 on the cap 18. The flange 114 has a longitudinal length in the rearward direction less than the length of the flange 74 of the pointer 20. More specifically, the length of the flange 114 is such that it does not cover the plate 92 of the flange 74 when the underside of the pointer 20 is abutted against a top surface of the filter 24. The filter 24 is preferably constructed from an opaque material.

The counterweight 54 comprises a C-shaped body 120 which defines a transverse groove 122 at a forward edge and a forwardly extending beveled surface 124 thereon. The counterweight 54 is constructed from a material of sufficient weight and rigidity to balance the weight of the distal end 78 of the pointer body 70 and prevent eccentric movement thereof.

To assemble the pointer assembly 12, the apertures 84 and 86 in the pointer 20 and attached liner 96, the apertures 116 and 118 in the filter 24, and the apertures 106 and 108 in the base 22 should successively be placed in vertical alignment so that the flanges 74, 114, and 102 are disposed in a stacked relationship. The counterweight 54 is mounted thereto so that the plate 92 on the pointer 20 and the flange 114 on the filter 24 are located within the transverse groove 122 and the beveled surface 104 of the flange 102 abuts the beveled surface 124 thereof. The cap 18 is then mounted to this assembly so that the vertical posts 66 and 68 are received within the above-described sets of aligned apertures. The counterweight 54 and rearward portions of the pointer 20, filter 24, and base 22 are received within the tail projection of the cap 18. The distal end 78 of the body 70 of the pointer 20 projects outwardly through the vertical channel 64 of the cap 18, and the proximal end 76 projects outwardly of or is visible within the horizontal channel 60 thereof. Alternatively, the flanged portions 74, 102, and 114 can be made of a particular size and weight so as to eliminate the need for the counterweight 54. The bottom portions of the vertical posts 66 and 68 are then heat staked to the underside of the base 22 to fixedly retain the cap 18, pointer 20, filter 24, and base 22 in a stacked relationship.

To mount the pointer assembly 12 to a conventional analog gauge 14, the shaft 30 of the gauge 32 is telescopically received within the aperture 28 of the shaft 26 of the base 22 so that rotation imparted to the shaft 30 by the gauge 32 is directly transmitted to the shaft 26 of the base 22. Illumination from a light source 36 is provided to a light pipe 34 which transmits the collected light from the light source 36 upwardly toward the base 22 at a point forward of the shaft 26. The transmitted light is redirected by the beveled surface 100 of the base 22 toward the rearward portion thereof where the light is once again redirected by the beveled surface 104 thereof. The light then travels upward into the proximal end 76 of the pointer 20 where it is redirected toward the distal end 78 of the pointer 20 by the beveled surface 90. Light rays which encounter the liner 96 mounted to the underside of the pointer 20 are reflected upwardly through the top surface of the body 70. The pointer is thereby provided with uniform illumination from the proximal end 76 to the distal end 78 of the pointer 20 and provides an analog display of the output of the gauge 32.

Figure 3:
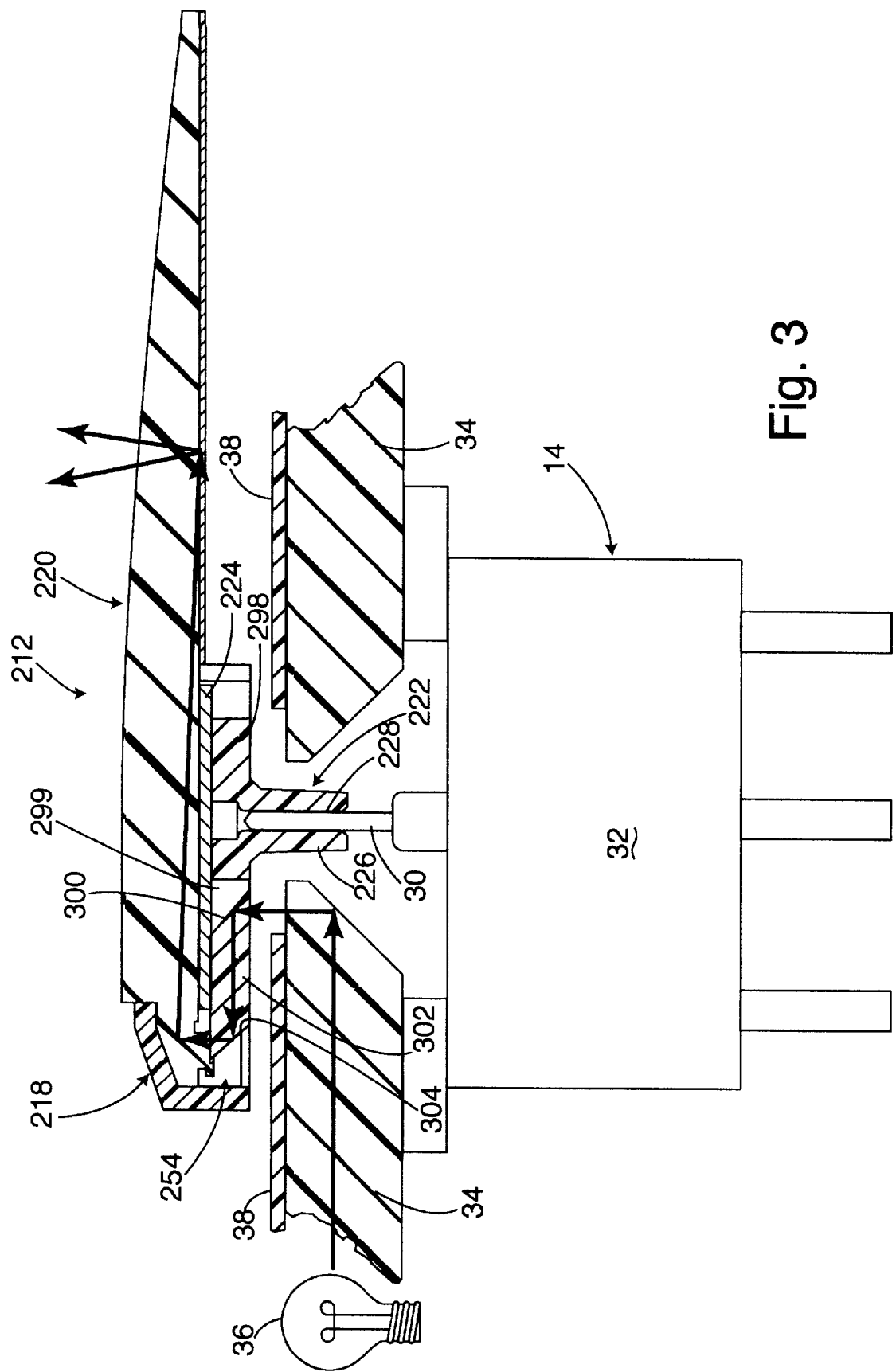
FIG. 3 is a partial, sectional view of a second embodiment of the pointer assembly according to the invention.

A second embodiment of the pointer assembly according to the invention is shown in FIG. 3 in which reference numerals are greater by 200 than the reference numerals which identify identical or analogous elements or features depicted in FIGS. 1 and 2. Thus, referring particularly to FIG. 3, a pointer assembly 212 comprises cap 218 which partially surrounds a pointer 220 and encloses a base 222, a filter 224, and a counterweight 254.

The cap 218, pointer 220, and filter 224 are configured identically as the cap 18, pointer 20, and filter 24 in FIGS. 1 and 2. The base 222 comprises a shaft 226 having an aperture 228 extending from its underside and further comprises a substantially circular body 298. A rectangular flange 302 extends from a rearward central portion of the body 298 and is provided with an inwardly-beveled rear surface 304. This embodiment of the base 222 is provided with a triangular indentation 299 which defines a rearwardly-facing beveled surface 300.

To assemble the pointer assembly 212, the cap 218, pointer 220, filter 224, and base 222 are mounted as in the previous embodiment by aligning apertures (not shown) on each element and receiving posts (not shown) on the cap 218 therein to fixedly retain the cap 218, pointer 220, filter 224, and base 222 in a stacked relationship.

In operation, light from a source 36 is provided to a conventional light pipe 34 so that illumination is directed upwardly toward a rearward portion of the shaft 226. The light is redirected by the beveled surface 300 within the flange 302 and towards the beveled surface 304. The light impinges on the beveled surface 304 and is further redirected upwardly by the beveled surface 304 into the pointer 220. The light is then transmitted throughout the length of the pointer 220 as in the embodiment of FIGS. 1 and 2 to provide uniform illumination thereto.

Figure 4:
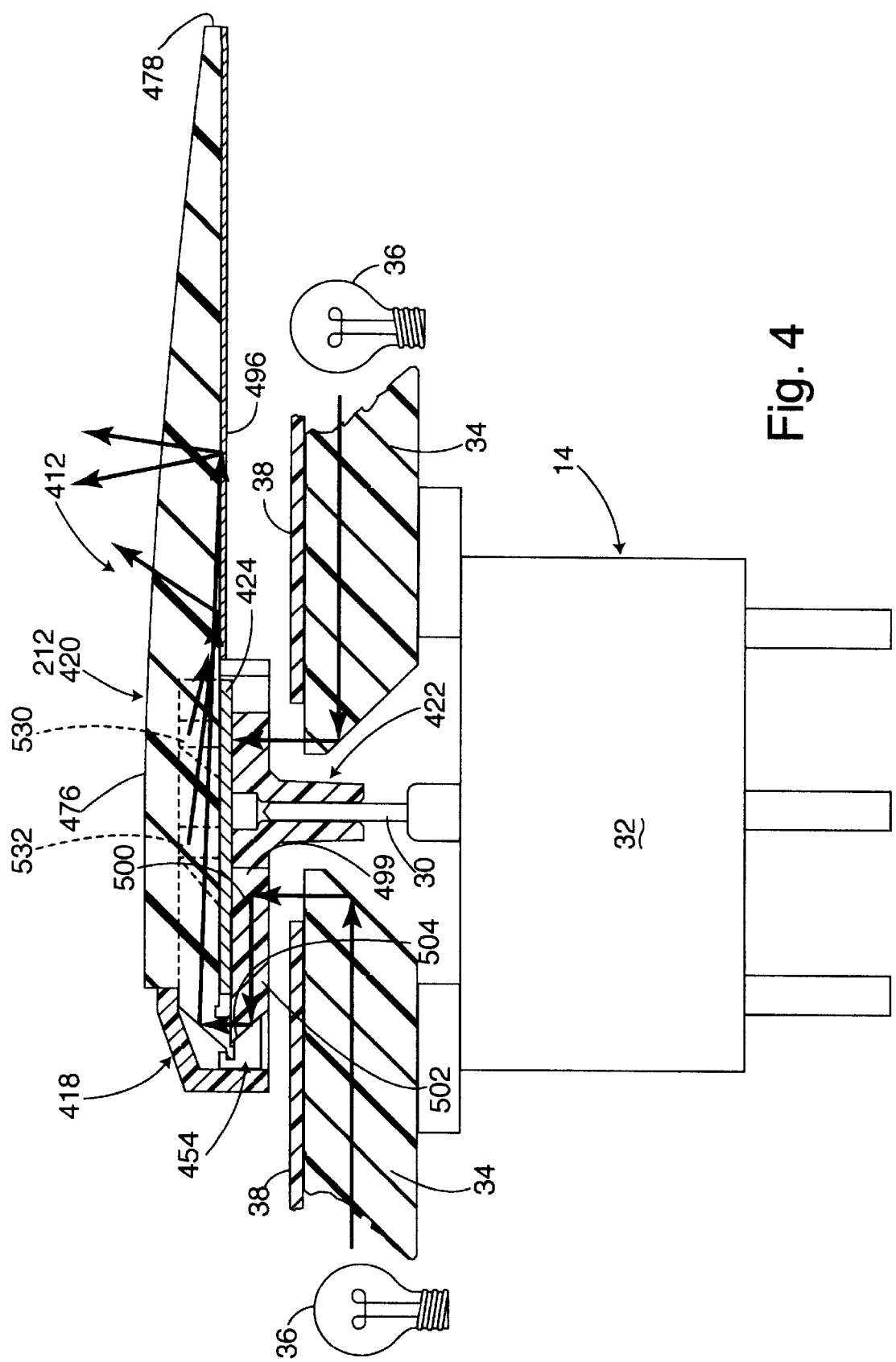
FIG. 4 is a partial, sectional view of a third embodiment of the pointer assembly according to the invention.
Figure 5:
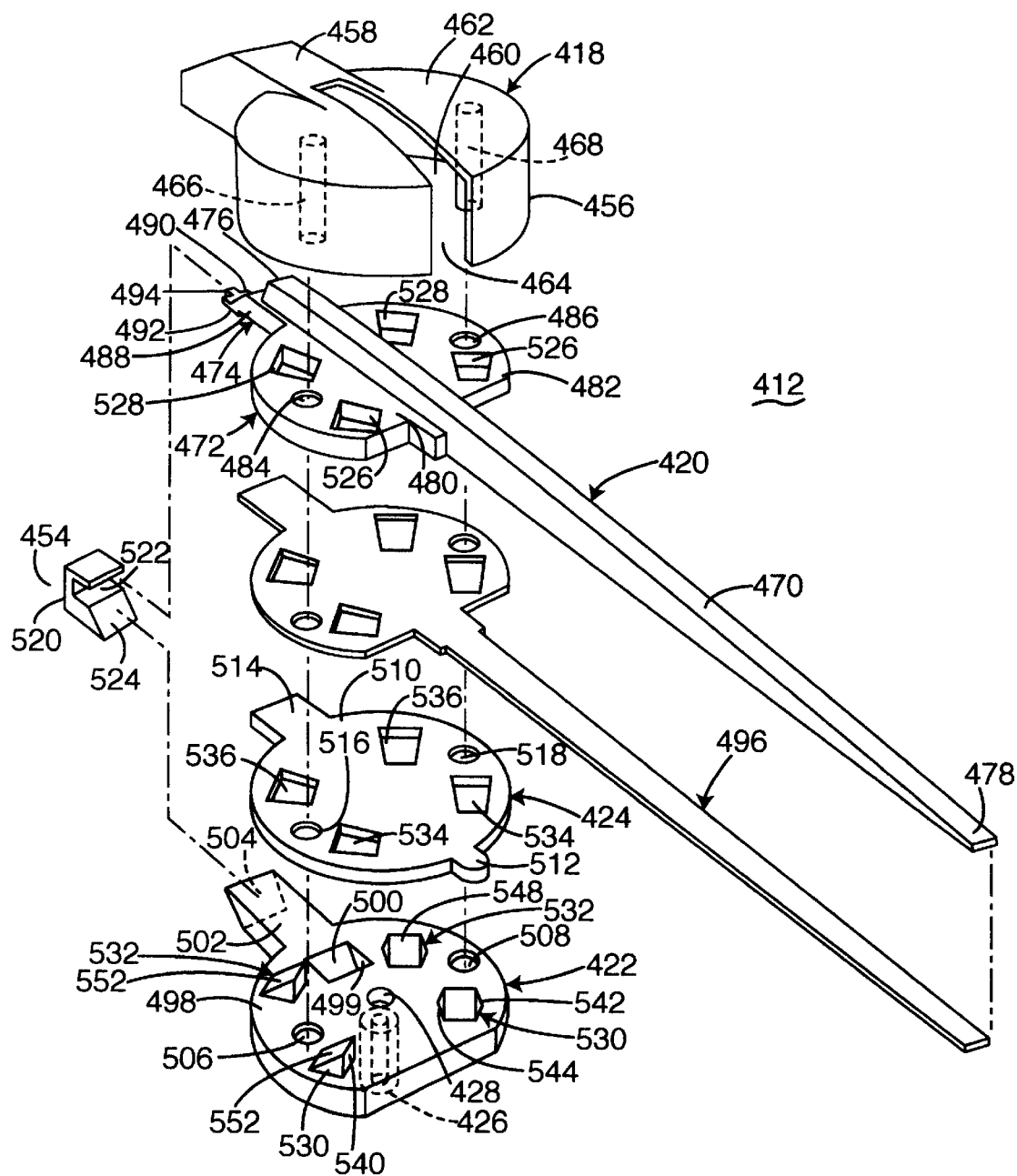
FIG. 5 is an exploded view of the pointer assembly of FIG. 4 with the remaining elements of the surroundings removed for clarity.
Figure 6:
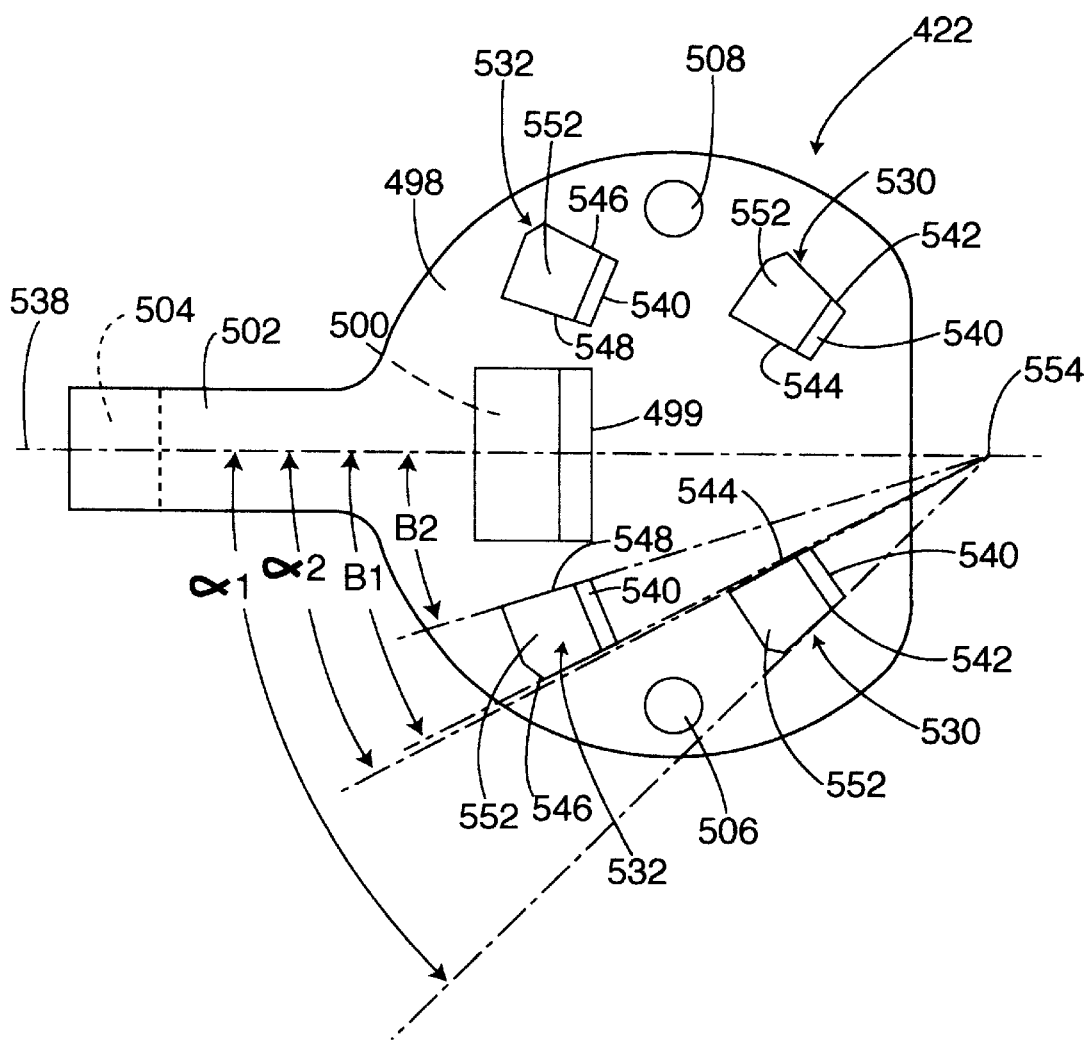
FIG. 6 is a top plan view of a base component of the pointer assembly of FIG. 4.

A third embodiment of the pointer assembly according to the invention is shown in FIGS. 4–6 in which reference numerals are greater by 400 than the reference numerals which identify identical or analogous elements or features depicted in FIGS. 1 and 2. Thus, referring particularly to FIGS. 4 and 5, a pointer assembly 412 comprises cap 418 which partially surrounds a pointer 420 and encloses a base 422, a filter 424, and a counterweight 454.

The pointer assembly 412 is shown in greater detail in FIG. 5. In this embodiment, the cap 418 in the pointer assembly 412 partially surrounds the pointer 420 and the base 422. In this embodiment, a counter-weight 454 is also provided at the tail of the pointer 420.

The cap 418 comprises a substantially cylindrical shell body 456 having a rounded top surface 462 and a tail projection 458 extending from one end thereof. A substantially horizontal channel 460 is formed in the top surface 462 of the cap and extends from the tail projection 458 across the entire top surface 462 and terminates in a substantially vertical channel 464 in the body 456. First and second vertical posts 466 and 468 extend downwardly from the interior surface of the top surface 462 and are spaced on either side of the horizontal channel 460.

The pointer 420 comprises an elongated tapered body 470, a circular pedestal 472, and a flange 474. The body 470 has proximal end 476 and a distal end 478 tapered so that the greatest height of the body is at or near the proximal end 476 and the narrowest height of the body 470 is adjacent the distal end 478. The pedestal 472 extends laterally outwardly from the body 470 adjacent the proximal end 476 so that the tapered body 470 divides the pedestal 472 into two substantially equal semi-circular portions 480 and 482. Each semi-circular portion 480 and 482 is provided with an aperture 484 and 486 in a spaced alignment to correspond to the configuration of the spaced posts 466 and 468 on the cap 418. Each semicircular portion 480 and 482 is provided with first and second angularly-disposed quadrangular recesses 526 and 528, respectively, the orientation of which will be described in greater detail below. The flange 474 extends rearwardly from the pedestal 472 adjacent the proximal end 476 of the body 470 and comprises a trapezoidal body 488 having a beveled rear surface 490 and a horizontal plate 492 extending rearwardly adjacent the bottom edge of the rear surface 490 which terminates in a tab 494. The underside of the pointer 420 is further provided with a liner 496 as in the previous embodiments which covers the entire underside of the pointer 420 except for the recesses 484 and 486 and the recesses 526 and 528.

The base 422 comprises the shaft 426 having aperture 428 extending from its underside and further comprises a substantially circular body 498. A rectangular flange 502 extends from a rearward central portion of the body 498 and is provided with an inwardly-beveled rear surface 504. This embodiment of the base 422 is provided with a triangular indentation 499 which defines a rearwardly-facing beveled surface 500. The body 498 is further provided with first and second apertures 506 and 508 in a spaced alignment to correspond to the configuration of the spaced posts 466 and 468 on the cap 418. The body 498 of the base 422 also has first and second angularly-disposed triangular protrusions 530 and 532 located on each side of a centerline 538 of the body 498. Each protrusion 530 and 532 has a vertical forward wall 540 and a beveled rear surface 552 thereon. It has been found that the beveled surfaces 552 should preferably make a 45-degree angle with the horizontal upper surface of the body 498.

The filter 424 comprises a substantially circular body 510 having a rounded tab 512 at a forward portion and a rectangular flange 514 at a directly opposite rearward portion. The body 510 is further provided with first and second apertures 516 and 518 in a spaced alignment to correspond to the configuration of the spaced posts 466 and 468 on the cap 418. The body 510 of the filter 424 is further provided with first and second angularly-disposed quadrangular recesses 534 and 536, respectively, the orientation of which will be described in greater detail below.

The counterweight 454 comprises a C-shaped body 520 which defines a transverse groove 522 at a forward edge and a forwardly-extending beveled surface 524 thereon.

The orientation of the protrusions 530 and 532 on the base 422 will now be described. It will be understood that the recesses 526 and 528 of the pointer 420 and the recesses 534 and 536 of the filter 424 are aligned with the protrusions 530 and 532 of the base 422 so as to receive the protrusions therein. The protrusions 530 have lateral edges defined by first and second walls 542 and 544. The protrusions 532 have lateral edges defined by first and second walls 546 and 548. The first walls 542 and 546 make angles of $\alpha_1$ and $\alpha_2$, respectively, with respect to centerline 538. The second walls 544 and 548 make angles of $\beta_1$ and $\beta_2$, respectively, with respect to centerline 538. It will be understood that the axes defined by first and second walls 542, 544, 546 and 548 can be extended toward the forward portion of the base 422 so that they intersect at a single point 554. The angles $\alpha_1$, $\alpha_2$, $\beta_1$ and $\beta_2$ can be selected so as to maximize the amount of redirected light through each of the protrusions 530 and 532. For example, it has been found that angles of $\alpha_1=45°$, $\alpha_2=25.2°$, $\beta_1=20°$ and $\beta_2=12.7°$ provide highly desirable results for particular lengths of the body 470 of the pointer 420.

To assemble the pointer assembly 412, the apertures 484 and 486 in the pointer 420 and attached liner 496, the apertures 516 and 518 in the filter 24, and the apertures 506 and 508 in the base 422 should successively be placed in vertical alignment so that the flanges 474, 514 and 502 are disposed in a stacked relationship and the protrusions 530 and 532 of the base 422 extend through the recesses 534 and 536 in the filter 424 and rest substantially within the recesses 526 and 528 in the pointer 420. The counterweight 454 is mounted thereto so that the plate 492 on the pointer 420 and the flange 514 on the filter 424 are located within the transverse groove 522 and the beveled surface 504 of the flange 502 abuts the beveled surface 524 thereof. The cap 418 is then mounted to this assembly so that the vertical posts 466 and 468 thereon are received within the above-described sets of aligned apertures. The counterweight 454 and rearward portions of the pointer 420, filter 424 and base 422 are received within the tail projection of the cap 418. The distal end 478 of the body 470 of the pointer 420 projects outwardly through the vertical channel 464 of the cap 418 and the proximal end 476 projects outwardly of or is visible within the horizontal channel 462 thereof. The bottom portions of the vertical posts 466 and 468 are then heat staked to the underside of the base 422 to fixedly retain the cap 418, pointer 420, filter 424 and base 422 in a stacked relationship. The pointer assembly 412 can then be mounted to a conventional analog gauge 14 as described before.

Illumination from a light source 36 is provided to a light pipe 34 which transmits the collected light from the light source 36 upwardly toward the base 422 at a point forward of the shaft 426. The transmitted light is redirected by the beveled surface 500 of the base 422 toward the rearward portion thereof where the light is once again redirected by the beveled surface 504 thereof. The light then travels upward into the proximal end 476 of the pointer 420 where it is redirected toward the distal end 478 of the pointer 420 by the beveled surface 490. Light rays which encounter the liner 496 mounted to the underside of the pointer 420 are reflected upwardly through the top surface of the body 470. In addition, light is also collected from the underside of the base 422 and is transmitted through the body 498 of the base 422. The collected light is redirected off of the beveled surfaces 552 of the protrusions 530 and 532 and into the pedestal 472 of the pointer 420. Due to the orientation of the protrusions 530 and 532 on each side of the pedestal 472, all collected light redirected by the protrusions 530 and 532 is directed along a centerline of the body 470 of the pointer 420. Thus, the protrusions 530 and 532 provide additional illumination along the length of the body 470. The pointer 420 is thereby provided with uniform illumination from the proximal end 476 to the distal end 478 of the pointer 420 and provides an analog display of the output of the gauge 32.

It should be noted that the primary purpose of the beveled surface 500 is to redirect light towards the proximal end 476 of the pointer 420 so that illumination is provided between the proximal end 476 and the forward end of the pedestal 470 of the pointer 420. The primary purpose of the protrusions 530 and 532 on the filter 422 is to redirect light along the longitudinal axis of the pointer body 470 towards the distal end 478 of the pointer 420.

Reasonable variation and modification are possible within the spirit of the foregoing specification and drawings without departing from the scope of the invention.

What is claimed is:

1. A pointer assembly for use with a gauge assembly for producing an analog display of the output of said gauge assembly, said pointer assembly being further adapted for use with a light source and a conducting means for conducting light from said light source to said pointer assembly, said pointer assembly comprising:

a base portion having a first angled surface for redirecting light received from said conducting means, said light being redirected in a rearward direction;

said base portion have a second angled surface located rearwardly of said first angled surface for again redirecting light received from said conducting means and from said first angled surface, said light being redirected upwardly by said second angled surface;

a pointer having an elongated tapered body, and comprising a proximal end, a distal end and a flange portion having a third angled surface adjacent said proximal end;

said light which is redirected from said second angled surface is directed to said third angled surface and redirected therefrom toward said distal end of said pointer;

a liner coupled to an underside of said pointer, whereby when light rays redirected from said third angled surface encounter said liner, said light rays are reflected upwardly through a top surface of said pointer, thereby providing said pointer with uniform illumination from said proximal end to said distal end of said pointer, and thereby providing an analog display of the output of said gauge assembly; and a pair of triangular protrusions, each protrusion extending upwardly from the base portion and being located on different sides of a centerline of the body of the pointer, the protrusions being spaced apart from said point and being positioned so that collected light redirected by the protrusions will be directed along the centerline of the body of the pointer.

\* \* \* \* \*